(12) United States Patent
Gandhi et al.

(10) Patent No.: US 11,547,191 B2
(45) Date of Patent: Jan. 10, 2023

(54) ELECTRONIC DEVICE ENCASEMENT WHICH STORES AND PRESENTS DATA CARDS

(71) Applicant: FELLOWES MOBILE LLC, Itasca, IL (US)

(72) Inventors: Harsh Gandhi, Palatine, IL (US); Benjamin MacBeth, Elmhurst, IL (US); Jeffrey Lienemann, Chicago, IL (US); Richard Kang, Elgin, IL (US); Tai Hoon K. Matlin, Round Lake Beach, IL (US); Steve Carson, River Forest, IL (US)

(73) Assignee: FELLOWES MOBILE LLC, Itasca, IL (US)

( * ) Notice: Subject to any disclaimer, the term of this patent is extended or adjusted under 35 U.S.C. 154(b) by 0 days.

(21) Appl. No.: 17/074,169

(22) Filed: Oct. 19, 2020

(65) Prior Publication Data

US 2021/0137232 A1    May 13, 2021

Related U.S. Application Data

(62) Division of application No. 16/370,326, filed on Mar. 29, 2019, now Pat. No. 10,842,238.

(60) Provisional application No. 62/650,046, filed on Mar. 29, 2018.

(51) Int. Cl.
| | | |
|---|---|---|
| H04B 1/38 | (2015.01) | |
| A45C 11/18 | (2006.01) | |
| A45C 13/02 | (2006.01) | |
| H04B 1/03 | (2006.01) | |
| A45C 11/00 | (2006.01) | |
| H04B 1/3888 | (2015.01) | |
| H04M 1/18 | (2006.01) | |

(52) U.S. Cl.
CPC .......... *A45C 11/182* (2013.01); *A45C 13/02* (2013.01); *H04B 1/03* (2013.01); *A45C 2011/002* (2013.01); *H04B 1/3888* (2013.01); *H04M 1/185* (2013.01)

(58) Field of Classification Search
CPC ..... H04B 1/3883; H04B 1/03; H04M 1/0206; H04M 1/0208; H04M 1/815; A45C 11/182; A45C 13/002
See application file for complete search history.

(56) References Cited

U.S. PATENT DOCUMENTS

| | | | | |
|---|---|---|---|---|
| 6,026,873 A | * | 2/2000 | Van Geer | A45C 11/182 150/147 |
| 2005/0150961 A1 | * | 7/2005 | Porter | G06K 19/005 235/486 |
| 2017/0112246 A1 | * | 4/2017 | Lawson | A45D 33/26 |

* cited by examiner

*Primary Examiner* — Tuan Pham
(74) *Attorney, Agent, or Firm* — Wood, Phillips, Katz, Clark & Mortimer

(57) ABSTRACT

Disclosed herein is a case for a portable electronic device. The case has a back wall and a plurality of side walls for retaining the portable electronic device. The back wall includes a storage area. A cover is hingedly attached to the back wall to selectively cover the storage area. The storage area includes a grip for retaining edges of data cards.

10 Claims, 8 Drawing Sheets

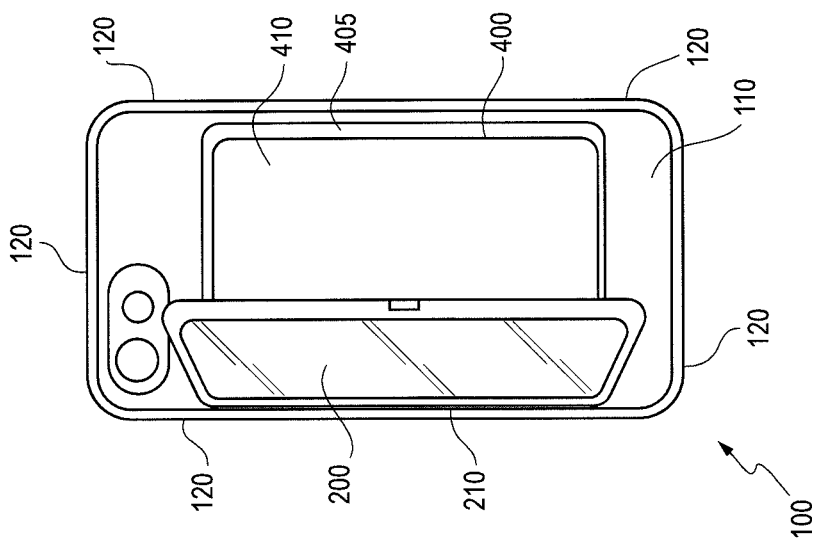
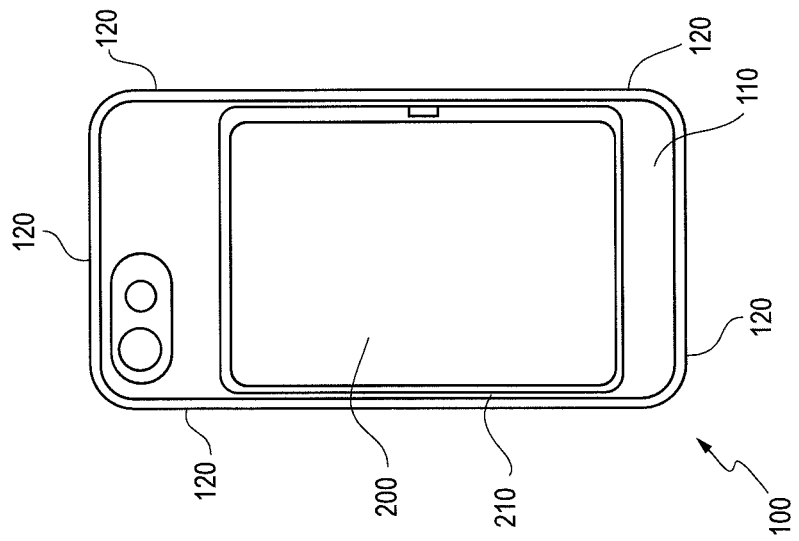

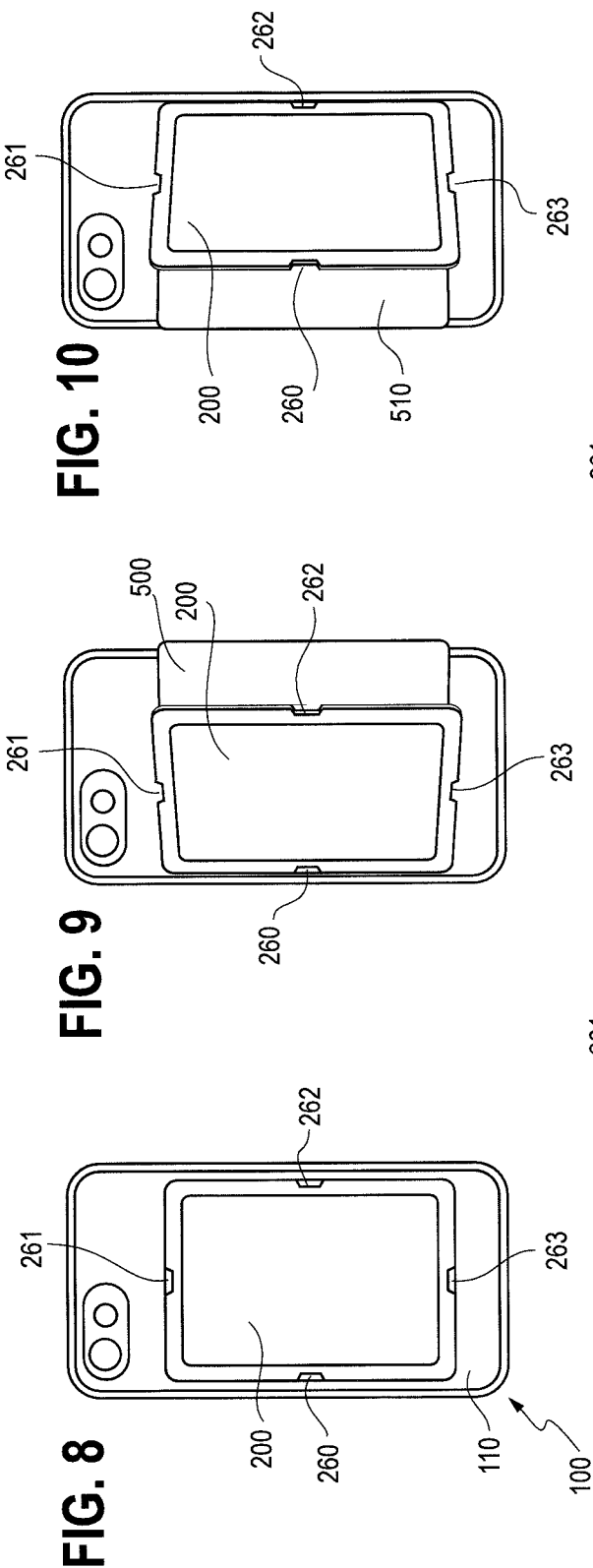
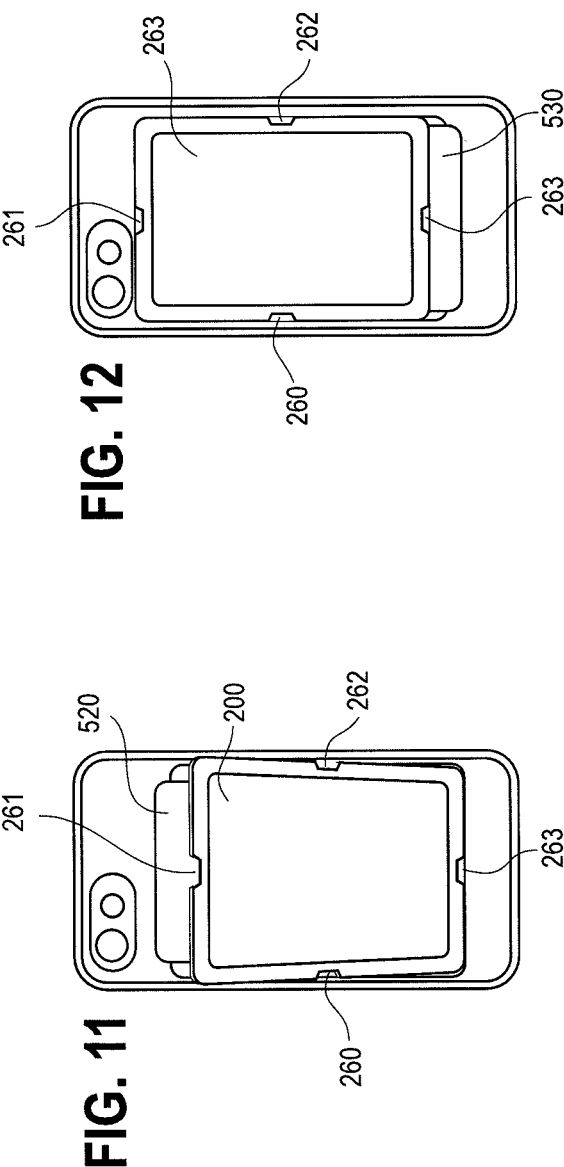

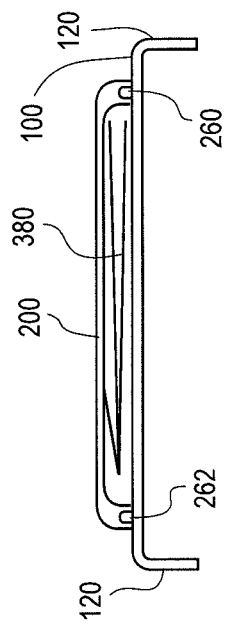
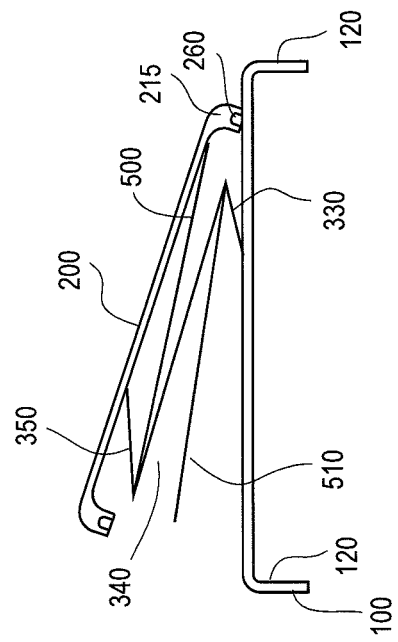
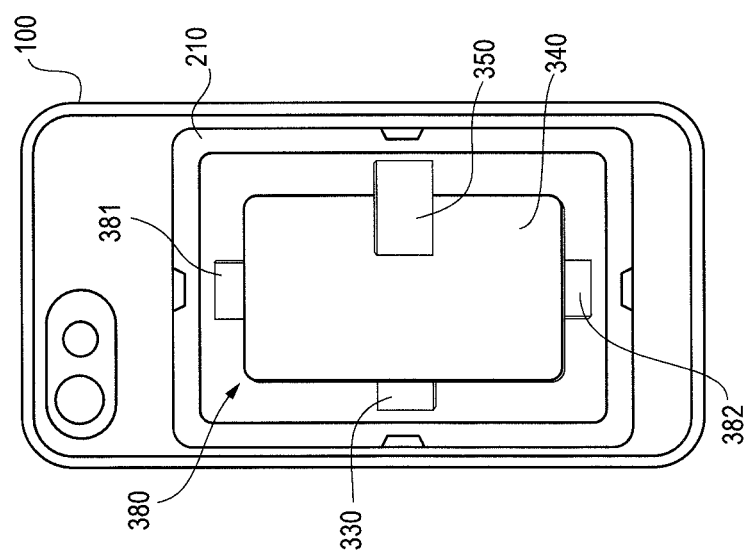

ELECTRONIC DEVICE ENCASEMENT WHICH STORES AND PRESENTS DATA CARDS

BACKGROUND OF THE INVENTION

Field of the Invention

The present patent application relates to a protective functional case used with portable electronic devices. More specifically, the application relates to a case which is configured to store one or more data cards, allow access to them in a way as to present the card to enhance ease of access and ease of use of the one or more data cards.

Background Art

Electronic device encasements have been around for many years, and many of them have supplemental features beyond the protective nature of the encasement, such as mounting features, LED lights, expansion of memory, and power and so on. The category of supplemental features of this application are the additional storage and organizational features provided to store or protect items other than the portable electronic device, such as data cards. As the frequent use and need to access electronic devices in our everyday lives increases, the placement of these devices competes with other important items needed frequent access such as billfolds, money clips, wallets, and or other items traditionally carried in purses, bags, cases, and pockets. Due to these observations, some encasement and folio products of the prior art have included supplemental storage functions which combine a protective encasement for the electronic device with supplemental storage to minimize the need to carry multiple items.

U.S. Pat. No. 8,418,852 is an example claiming a compartmentalized protective case for portable handheld device, including a compartment for housing the electronic device and a second compartment configured for receiving and housing personal items. The second compartment and compartment for the device are piggybacked upon one another. The second compartment is enclosed with a hinged storage cover with an open bottom side, which the open bottom side when hinged closed, becomes a storage cover for the mobile device. This prior art does not offer any feature or structure to hold, cradle, display, separate, or provide any manipulation of the articles stored within.

U.S. Pat. No. 8,267,251 is an example of a one-piece case which encloses a personal electronics device comprising a flexible inner layer and a hard-exterior layer being sufficiently flexible as to deform and accept the insertion of the personal electronic device with the flexible inner layer creating a second fitted cavity configured to accept and retain at least one card through an opening on the side surface of the case. While the flexible nature of this prior art allows the case to better secure the item stored therein, it does nothing to separate, manipulate, or otherwise aid the user in selecting among the items stored therein.

In addition, there have been folio products in the market today which hold mobile electronic devices, the folios hinging or folding open to expose the mobile electronic device. Rather than including a compartment to store things such as data cads, the interior surface of the folio includes a slotted arrangement or pockets which retain and hold cards within. The devices have the same problems or shortcomings discussed above.

Additionally, the devices of the prior art either retain the cards and items stored within too loosely as to not functionally hold, divide and secure them properly or they hold and retain the cards and items too tightly as to make it difficult to load or access the retained items having undesirable effects. The invention disclosed herein includes improvements and additional features to electronic device encasements which store data cards.

SUMMARY OF THE INVENTION

In one form the invention is directed to a case for a portable electronic device. The case has a back wall and a plurality of side walls for retaining the portable electronic device. The back wall includes a storage area. A cover is hingedly attached to the back wall to selectively cover the storage area. The storage area includes a grip for retaining edges of data cards.

In one form, the grip includes a plurality of protrusions creating gripping voids for receiving the edges of data cards.

In one form, the grip includes a plurality of protrusions defining channels therebetween. The grip has a flexed state where the channels are wider than when the grip is in an unflexed state.

In one form, the case further includes a grip first end attached to the case back wall and a grip second end attached to a sliding actuator. The sliding actuator is also attached to the case cover.

In one form, opening the case cover causes the grip to transition from the relaxed state to the flexed state.

In one form, the grip is a flexible member. The grip flexes in a first direction to receive the data cards and in a second direction to retain the data cards.

In one form, the grip has protrusions and voids. The voids receive the edges of data cards. The grip has an unflexed position for gripping the edges of data card and a flexed position for releasing the edges of data cards. A grip first end is attached to the case back wall. A grip second end is attached to an actuator attached to the case cover, such that opening the case cover flexes the grip.

In one form, the case has a back wall and a plurality of side walls for retaining the portable electronic device. The case has a storage area. A cover is hingedly attached to the case to selectively cover the storage area. The storage area has a flexible member for receiving and selectively retaining edges of data cards.

In one form, the flexible member has alternating protrusions and voids positioned to allow the voids to receive the edges of data cards when the flexible member is in a flexed configuration. The protrusions grip the data cards when the flexible member is in a relaxed configuration.

In one form, the flexible member is flexed by an actuator attached to the cover.

In one form, the flexible member protrusions spread apart when the flexible member is flexed.

In one form, the flexible member flexes when the cover is open.

In one form, the flexible member is relaxed when the cover is closed.

In one form, the flexible member forms an arc when flexed.

In one form, the invention is directed to a case for a portable electronic device. The case has a back wall and a plurality of side walls for retaining the portable electronic device. The back wall includes a storage area accessible from the outside of the case. A cover is hingedly attached to the back wall to selectively cover the storage area. The storage area has a flexible member for gripping and for presenting data cards.

In one form, the flexible member has voids and protrusions. The protrusions grip data cards that are placed in the voids.

In one form, the flexible member has a flexed state and a relaxed state. The flexible member has gripping voids between protrusions. The gripping voids receive the edges of the data cards when the flexible member is in the flexed state and grip the data cards when in the relaxed state.

In one form, the flexible member has a flexed state and a relaxed state. The flexible member has gripping voids between protrusions to grip the data cards when stored in the case. The gripping voids release the grip when the flexible member is in the flexed state.

In one form, the flexible member further presents the data cards when in the flexed state.

In one form, the flexible member has a gripping state and an inverse state. The flexible member has protrusions and voids. The protrusions spread apart when the flexible member is in the inverse state. The protrusions are closer together when the flexible member is in the gripping state.

BRIEF DESCRIPTION OF THE DRAWINGS

FIG. 1 is a view of the electronic device encasement as seen from the back, with the cover closed.

FIG. 2 is a view of the electronic device encasement as seen from the back, with the cover open reveling the storage area.

FIG. 8 is a view of the electronic device encasement as seen from the back with the cover closed. subfigures showing the storage feature in an embodiment which includes multiple access points with each access point allowing direct access to a given storage pocket which separates and presents each item when stored FIG. 9 is a view of the electronic device encasement as seen from the back with the cover open and hinged in a first position, allowing access to a first storage pocket.

FIG. 10 is a view of the electronic device encasement as seen from the back with the cover open and hinged in a second position, allowing access to a second storage pocket.

FIG. 11 is a view of the electronic device encasement as seen from the back with the cover open and hinged in a third position, allowing access to a third storage pocket.

FIG. 12 is a view of the electronic device encasement as seen from the back with the cover open and hinged in a fourth position, allowing access to a fourth storage pocket.

FIG. 13 is a view of the electronic device encasement as seen from the back with the cover removed showing the pocket structure in a folded configuration.

FIG. 14 is a cross-sectional view of the electronic device encasement showing the pocket structure in a folded configuration.

FIG. 15 is a cross-sectional view of the electronic device encasement showing the pocket structure in an open configuration.

DETAILED DESCRIPTION OF THE PREFERRED EMBODIMENT

Figure 5:
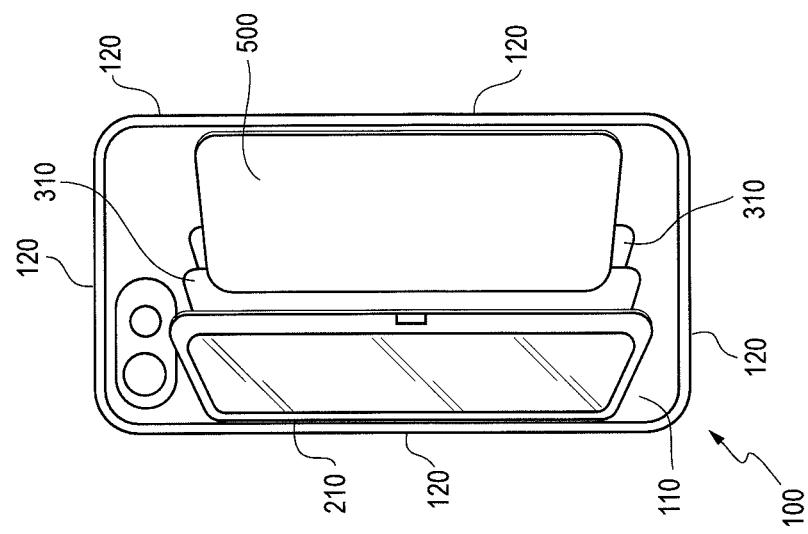
FIG. 5 is a view of the electronic device encasement as seen from the back showing the storage feature in the open position, the storage feature including data cards being removed from a plurality of pockets.

With reference to the figures, FIG. 1 is an exemplary illustrative view of the electronic device encasement 100 as seen from the back. The encasement 100 is understood to be one that goes over and is supplemental to the encasement or case that encloses the electronics of the electronic device as provided by a commercial manufacturer. However, the added features described herein could be applied to the manufacturer's encasement. FIG. 1 also shows the storage feature in its closed position with the cover or lid 200 against the back wall 110 to contain the contents of the storage feature.

The encasement 100 includes a back wall 110 and sidewalls 120 which include holding details such as a slight undercut or lip on one or more of the sidewalls 120 to retain the electronic device (not shown) within the encasement 100 securely. The movably attached storage lid or cover 200 in the closed position in FIG. 1 and in an open position fore receiving or presenting contents in FIG. 2. The cover 200 is hingedly attached to the encasement 100 back wall 110 with a hinge 210. The hinge 210 can optionally have detent details which allow the storage cover 200 to be articulated in an optimal position or positions between fully open and fully closed. In such an embodiment, the cover 200 may be propped open as to create a kickstand like feature which allows the encased electronic device to be viewed at a range of angles when encasment 100 is place onto a surface.

FIG. 2 shows the movable attached storage cover 200 in the open position exposing storage area 410 having an opening 400 for receiving and presenting contents. Between storage opening 400 and encasement back wall 110, an optional gasket 405 is positioned in such a way as to create a protective seal when storage cover 200 is in the closed position as to not allow foreign unwanted objects or liquids from entering storage area 410. For instance, the gasket 405 makes sealing contact with the perimeter of the cover 200 and the back wall 110.

Figure 4:
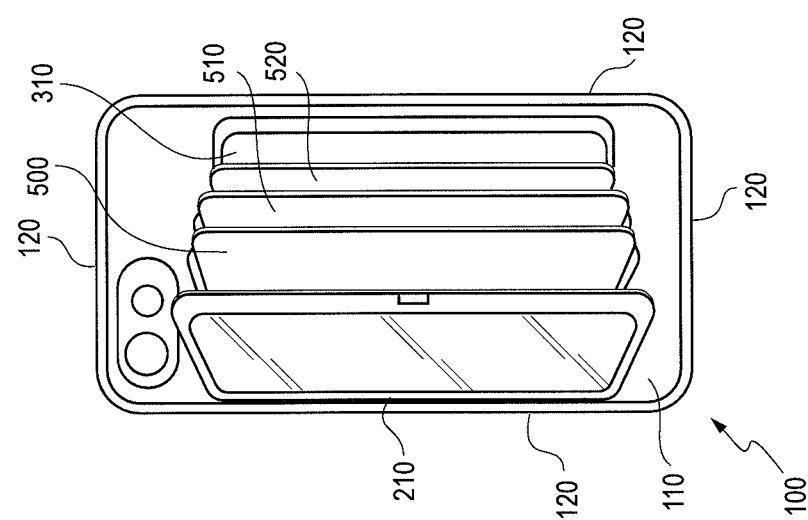
FIG. 4 is a view of the electronic device encasement as seen from the back showing the storage feature in the open position, the storage feature including data cards inserted into a plurality of pockets.
Figure 3:
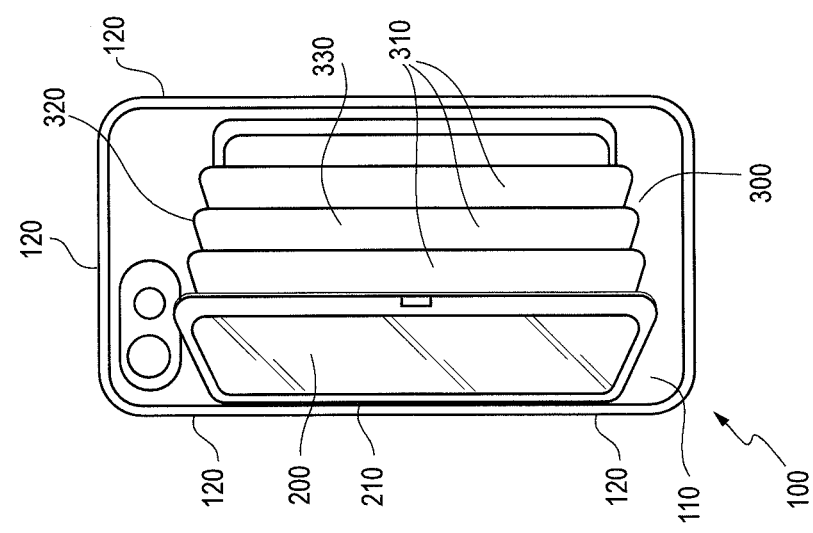
FIG. 3 is a view of the electronic device encasement as seen from the back showing the storage feature in the open position, the storage feature including a plurality of pockets for receiving data cards.

FIGS. 3-5 show the electronic device encasement 100 as seen from the back, including a storage feature for holding, separating, and presenting a plurality of stored data cards 500. The storage feature removably or permanently installed plurality of pockets constructed from a thin material such as a vinyl or PVC with an optional gripping texture or additive finish with a semi rigid dividers 310 and a folding side elements 320 connecting the dividers 310 and defining pockets similar to an accordion folder. Such connected dividers 310 can create at least a single pocket or optionally a series of pockets as shown. The pocket or divider 310 nearest storage cover 200 would be removably attached to the inner wall of cover 200 and the pocket or divider 310 nearest the backwall of the storage area, would have the divider 310 removably attached to the storage area's back wall in such a way that when storage cover 200 is unlatched and opened, the compressed pockets sequentially expand as to release its grip on the stored item or data card 500 and present the stored item, card or data card as shown in FIG. 5, allowing easy access and removal of the presented stored item/card 500. Inversely, inserting the data card 500 to be stored easily into the expanded and decompressed pocket with the action of closing the storage lid 200 actuates the pockets to sequentially compress and close gripping the data card 500 stored within the pocket securely when closing and latching the storage cover 200.

Figure 6:
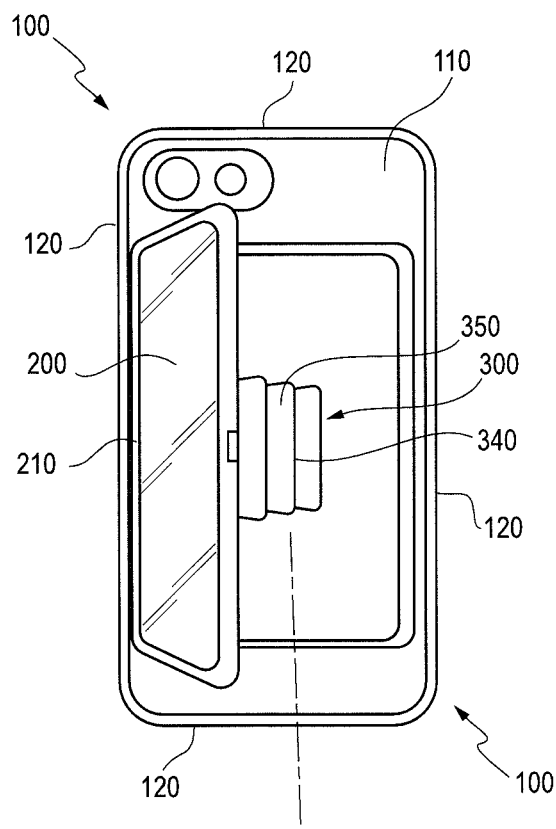
FIG. 6 is a view of the electronic device encasement as seen from the back showing the storage feature in the open position with a gripping structure to receive edges of data cards.
Figure 6A:
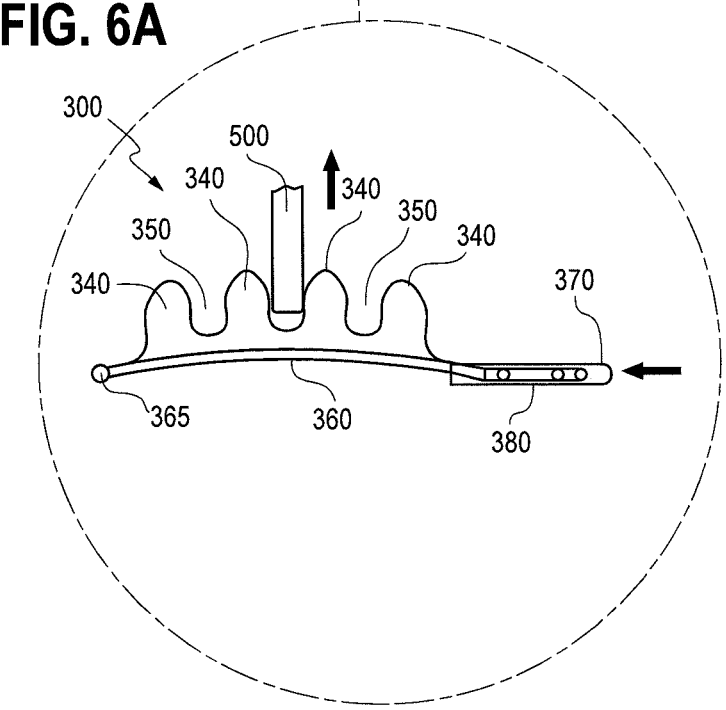
FIG. 6A is a close-up view of the gripping feature in the relaxed or receiving state, receiving an edge of a data card.
Figure 6B:
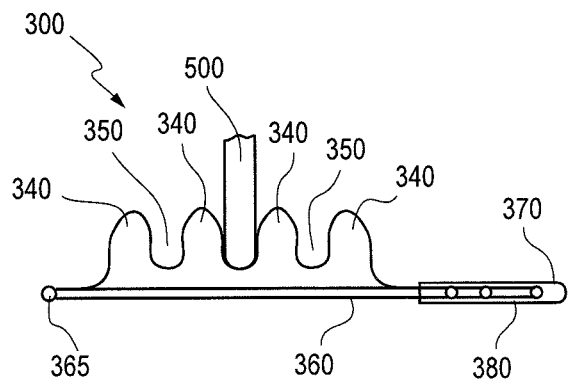
FIG. 6B is a close-up view of the gripping feature in the stretched or securing state, securing an edge of a data card.
Figure 7:
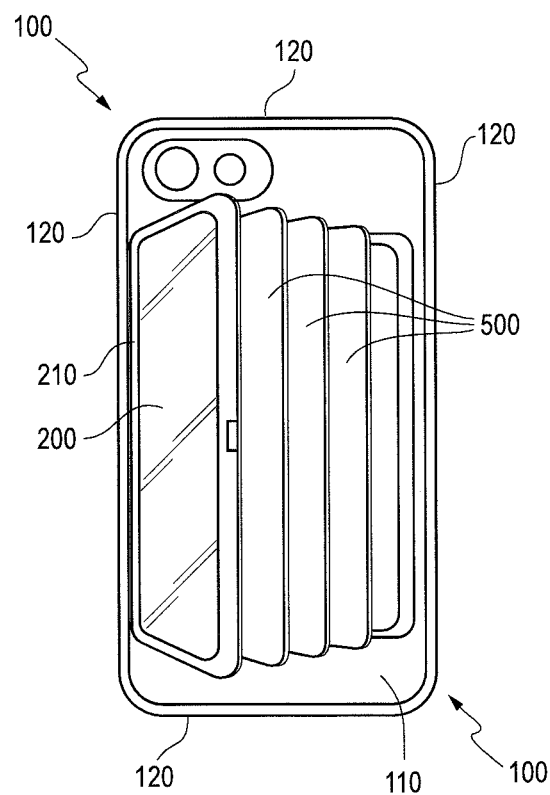
FIG. 7 is a view of the electronic device encasement as seen from the back showing the storage feature in the open position with a gripping structure that has received a plurality of data cards.

FIGS. 6, 6A, 6B, and 7 show the electronic device encasement 100 as seen from the back showing the storage feature in the open position, the storage feature being an alternative embodiment including a rack or grip 300 to capture the edge of data cards 500. The grip 300 includes an open state for receiving and presenting stored data cards 500, and a gripping state for holding or griping stored data cards 500. FIG. 7 shows the gripping feature in its more relaxed grip state, separating and presenting the stored item such as a data cards 500. FIGS. 6A and 6B show a detailed view of how the alternative gripping mechanism is actuated, or how the grip 300 is flexed to open or close, thereby gripping or releasing the captured data cards 500.

FIG. 6 shows storage cover 200 in the open position which actuates the separating and presenting feature in the more relaxed grip state, with FIG. 6A showing in more detail how the feature is activated. In FIG. 6A, the alternative embodiment shows the grip 300 being an elastomeric component which can be molded or formed from a TPU or TPE or similar material. The grip 300 includes a plurality of finger like protrusions 340 creating a griping void/s 350 therebetween in which the stored item or data card 500 is easily released when the grip 300 is flexed, and easily captured or griped when the grip 300 is relaxed. The grip 300 is flexed by means of a sliding actuator 380 operably connected to the storage lid 200, such that the sliding actuator is actuated by the action of opening the storage lid 200. The further the storage lid 200 is opened, the more the sliding actuator 380 compresses the grip 300, which is anchored or fixed on the opposing side by hinge pin 365, forcing the grip 300 into an upward flexed position. This position allows the fingers or protrusions 340 to spread apart or to open and release their grip on the now presented and ready to remove stored item or data card 500. FIG. 7 shows the storage element or grip 300 fully loaded with a plurality stored items such as a plurality of data cards 500. FIG. 6B shows the inverse state whereas the stored item 500 has been inserted into the gripping void 350 and with the storage door 200 in the closed position, actuator 380 is in the non-actuation position which allows the elastomeric fingers to return to their gripping state firmly securing stored data cards 500.

FIGS. 8-15 show a view of the electronic device encasement 100 as seen from the back, the case including a storage feature having a cover 200 that is hinged to the case back 110 by a plurality of hinges. In the embodiment shown in FIGS. 8-15, the cover is rectangular and has hinges located on at least two of the sides, preferably all four sides. This arrangement of hinges allow the cover 200 to be opened in four directions, allowing access to the storage area 410 and any contents, from four different sides. The embodiment shown includes a folded multi pocket assembly 350 having multiple access points which are configured as to be opened from at least two sides, and preferably four sides, or most preferably with a plurality of sides corresponding to the number of hinge directions of the cover 200, with each access point allowing direct access to a given storage pocket which separates and presents each card or purposefully grouped cards or stored items individually or in the subdivided groupings, in a manner that one can decide which card or stored items should be accessed and used in an as needed basis.

FIG. 8 shows the encasement 100 with the movably attaching and detaching storage cover 200 in the closed position. As shown in FIGS. 8-15 the movably attaching and detaching storage cover 200 has a plurality of open positions in which each stored item 500, 510, 520 and 530 is directly accessible in its released and presenting position for ease of removal from and or insertion for storage depending on which side of the storage cover 200 is accessed or which of a plurality of hinges 260-263 is utilized in opening the cover 200. The hinges 260-263 may be a snap fit retaining hinge. As shown in the figures, utilizing each of the hinges 260-263 allows access to a plurality of retaining pockets from different directions.

As shown in FIGS. 13-15, the retaining pockets are defined and created by a resiliently folded presenting and dividing element or pocket assembly 380 which is attached to the back wall of cover 200 by tab 350, to allow the appropriate pocket to open when a particular hinge is utilized to open the cover 200. For instance, as shown in FIG. 15, tab 350 is connected to cover 200, such that when hinge 260 is utilized, a pocket in the pocket assembly 380 is open to expose a data storage card 500. The pocket assembly 380 includes the main sub-divider 340 creating a retaining pocket for item 500. Tab 330 is a resiliently folded presenting and dividing element which is attached to the back wall 110 of the storage compartment 410 and to the main sub-divider 340 creating a retaining pocket for item 510, when attaching and detaching storage cover 210 is access from a particular side by releasing the appropriate hinge. Stored item 510 is released and presented by way of the resiliently folded element tab 330 straightening out thereby releasing and pushing stored item 510 from the stored position to the presented position making it easily removable and inversely easily inserted back into and held securely in its designated subdivided storage compartment or pocket. Similarly, one skilled in the art will recognize that tabs 381 and 382 can be attached to the cover 200 or case back wall 110 to open pockets in other directions, depending upon the hinge being used.

Figure 16:
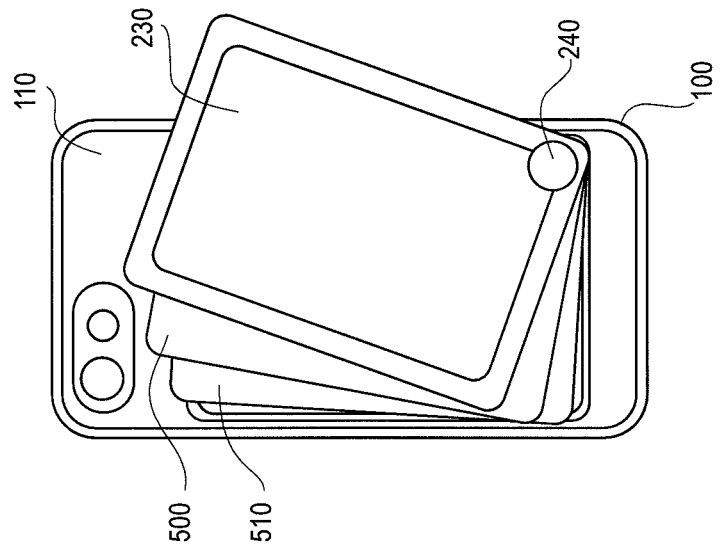
FIG. 16 is a view of the electronic device encasement as seen from the back, having a pivoting storage feature in the closed position.
Figure 17:
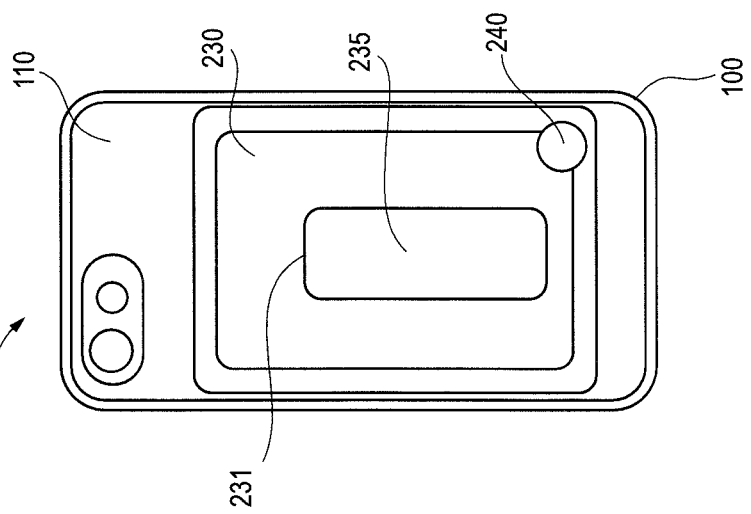
FIG. 17 is a view of the electronic device encasement as seen from the back, having a pivoting storage feature in the open position.
Figure 18:
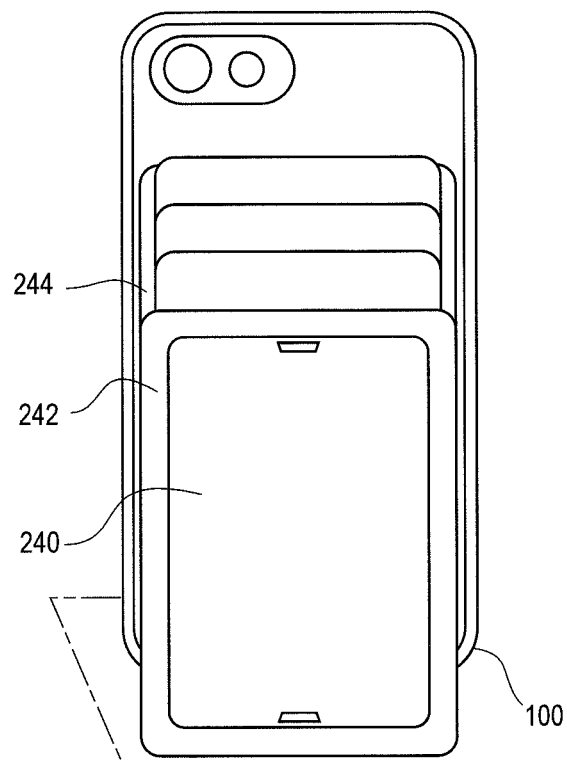
FIG. 18 is a view of the electronic device encasement as seen from the back with a sliding storage cover in a first open position, presenting stored data cards in a first direction.
Figure 19:
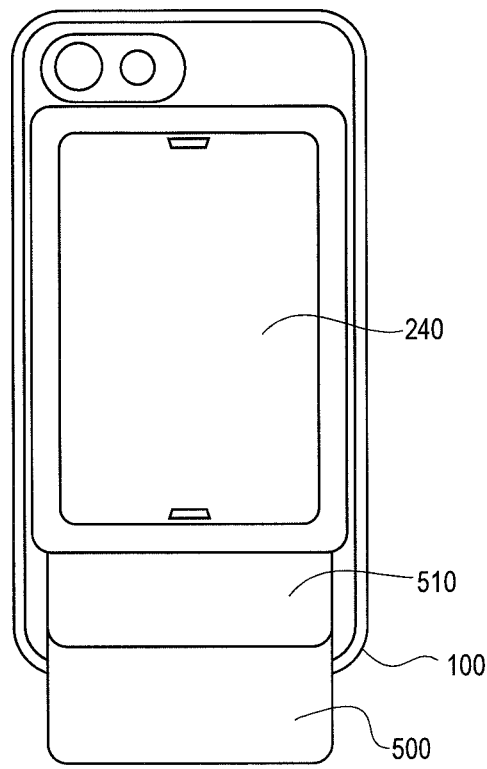
FIG. 19 is a view of the electronic device encasement as seen from the back with a sliding storage cover in a second open position, presenting stored data cards in a second direction.
Figure 18A:
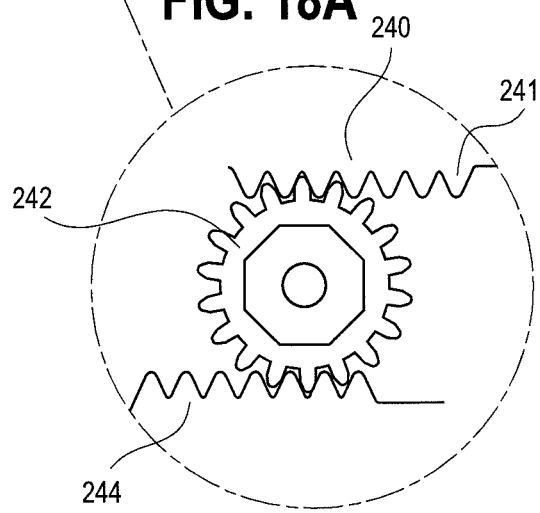
FIG. 18A is a close-up view of a double rack and pinion system to actuate the data card presenting element.

FIGS. 16 and 17 show an embodiment of the electronic device encasement 100 with a fanning of pivoting storage feature in the closed position and open position. FIG. 17 shows the feature holding, separating and presenting the stored data cards when the pivoting cover 230 is pivotably rotated by way of pivot member 240. The action of pivoting the storage cover 230 by way of the pivot member 240, a sequentially actuated feature then fans out the stored items in such a way as to release them from the stored and gripped position to the released and presented position as shown. The formerly stored item/s 500 and 510 are now easily removable from the separating and presenting element. The pivoting storage cover 230 can optionally include a subdivided axillary storage compartment 235 for storing small items which direct access and storage might be desirable. The axillary storage compartment 235 may include an axillary cover hingedly connected to the storage cover 230 at a hinge 23, allowing the storage cover for such axillary storage compartment 235 to act like a kickstand as to ensure a proper viewing angle for the encased electronic device when place onto a surface.

Figure 20:
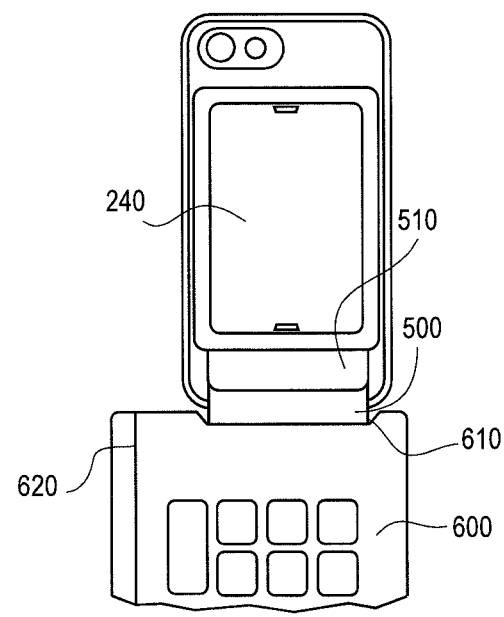
FIG. 20 is a view of the electronic device encasement as seen from the back with a sliding storage cover in an open position, presenting a stored data card for insertion into a card reading device.

An embodiment having a sliding storage lid or cover 240 is shown in FIGS. 18, 18A, 19 and 20. In such embodiment, the lid or cover 240 is slidably opened in opposite directions. The encasement 100 is seen from the back showing the storage feature in an open position by way of the movably attached and slidable storage cover 240. The assembly includes a storage element like those previously described, or a tray, pocket, or other structure to hold a single or plurality of data cards 510. The storage element may be connected to a rack and pinion mechanism to allow the sliding motion of opening the cover 240 to cause movement of the storage element in the opposite direction. The action of sliding the storage lid 240 with rack detail 241 incorporated or attached to the cover 240 causes rotating pinion gear 242 to rotate, which in actuates and optionally increasing the movement of the presenting and releasing element 244. Releasing element 244 may be incorporated into a storage element, or may be an element that engages, contacts, or otherwise pushes and presents the stored items 500 and 510 sequentially as to make it easy for the items to be removed from and inserted back into storage. FIG. 20 shows an alternative configuration in which the stored data cards 500 and 510 present themselves in a way that the primary card 500 can be inserted into a credit card machine 600 by way of insertion slot 610 or alternatively slide through scan slot 620 of the credit card machine without having to be totally removed from the storage compartment and or encasement 100.

The foregoing disclosure of specific embodiments is intended to be illustrative of the broad concepts comprehended by the invention.

The invention claimed is:

1. A case for a portable electronic device, the case including a back wall and a plurality of side walls for retaining the portable electronic device, the back wall including a storage area, a cover hingedly attached to the back wall to selectively cover the storage area, the storage area including a grip for retaining edges of data cards, wherein the grip includes a plurality of protrusions defining channels therebetween, the grip having a flexed state where the channels are wider than when the grip is in an unflexed state.

2. The case of claim 1 further including a grip first end attached to the case back wall, and a grip second end attached to a sliding actuator, the sliding actuator also attached to the case cover.

3. The case of claim 1 wherein opening the case cover causes the grip to transition from the relaxed state to the flexed state.

4. A case for a portable electronic device, the case including a back wall and a plurality of side walls for retaining the portable electronic device, the back wall including a storage area, a cover hingedly attached to the back wall to selectively cover the storage area, the storage area including a grip for retaining edges of data cards, the grip including protrusions and voids, the voids for receiving the edges of data cards, the grip having an unflexed position for gripping the edges of data card, and having a flexed position for releasing the edges of data cards, a grip first end being attached to the case back wall and a grip second end being attached to an actuator attached to the case cover, such that opening the case cover flexes the grip.

5. A case for a portable electronic device, the case including a back wall and a plurality of side walls for retaining the portable electronic device, the case including a storage area, a cover hingedly attached to the case to selectively cover the storage area, the storage area including a flexible member for receiving and selectively retaining edges of data cards, wherein the flexible member includes alternating protrusions and voids positioned to allow the voids to receive the edges of data cards when the flexible member is in a flexed configuration, and the protrusions gripping the data cards when the flexible member is in a relaxed configuration.

6. The case of claim 5 wherein the flexible member is flexed by an actuator attached to the cover.

7. A case for a portable electronic device, the case including a back wall and a plurality of side walls for retaining the portable electronic device, the back wall including a storage area accessible from the outside of the case, a cover hingedly attached to the back wall to selectively cover the storage area, the storage area including a flexible member for gripping and for presenting data cards, wherein the flexible member has a flexed state and a relaxed state, the flexible member including gripping voids between protrusions, the gripping voids receiving the edges of the data cards when the flexible member is in the flexed state, and gripping the data cards when in the relaxed state.

8. A case for a portable electronic device, the case including a back wall and a plurality of side walls for retaining the portable electronic device, the back wall including a storage area accessible from the outside of the case, a cover hingedly attached to the back wall to selectively cover the storage area, the storage area including a flexible member for gripping and for presenting data cards, wherein the flexible member has a flexed state and a relaxed state, the flexible member including gripping voids between protrusions to grip the data cards when stored in the case, the gripping voids releasing the grip when the flexible member is in the flexed state.

9. The case of claim 8, the flexible member further presenting the data cards when in the flexed state.

10. A case for a portable electronic device, the case including a back wall and a plurality of side walls for retaining the portable electronic device, the back wall including a storage area accessible from the outside of the case, a cover hingedly attached to the back wall to selectively cover the storage area, the storage area including a flexible member for gripping and for presenting data cards, wherein the flexible member has a gripping state and an inverse state, the flexible member having protrusions and voids, the protrusions spreading apart when the flexible member is in the inverse state, and the protrusions being closer together when the flexible member is in the gripping state.

* * * * *